United States Patent
Manjunath et al.

(10) Patent No.: US 10,296,523 B2
(45) Date of Patent: May 21, 2019

(54) SYSTEMS AND METHODS FOR ESTIMATING TEMPORAL IMPORTANCE OF DATA

(71) Applicant: Tata Consultancy Services Limited, Mumbai (IN)

(72) Inventors: Sumesh Manjunath, Pune (IN); Manish Shukla, Pune (IN); Sutapa Mondal, Pune (IN); Rohit Saxena, Pune (IN); Sachin Premsukh Lodha, Pune (IN)

(73) Assignee: Tata Consultancy Services Limited, Mumbai (IN)

( * ) Notice: Subject to any disclaimer, the term of this patent is extended or adjusted under 35 U.S.C. 154(b) by 558 days.

(21) Appl. No.: 15/061,915

(22) Filed: Mar. 4, 2016

(65) Prior Publication Data

US 2017/0091306 A1 Mar. 30, 2017

(30) Foreign Application Priority Data

Sep. 30, 2015 (IN) .......................... 3718/MUM/2015

(51) Int. Cl.
| | |
|---|---|
| G06Q 10/10 | (2012.01) |
| G06F 16/28 | (2019.01) |
| G06F 17/16 | (2006.01) |
| G06F 11/14 | (2006.01) |
| G06Q 10/00 | (2012.01) |
| G06F 16/00 | (2019.01) |

(52) U.S. Cl.
CPC ............ *G06F 16/285* (2019.01); *G06F 11/14* (2013.01); *G06F 16/00* (2019.01); *G06F 17/16* (2013.01); *G06Q 10/00* (2013.01)

(58) Field of Classification Search
None
See application file for complete search history.

(56) References Cited

U.S. PATENT DOCUMENTS

| | | | |
|---|---|---|---|
| 7,516,131 B2 | 4/2009 | Chen et al. | |
| 7,739,284 B2 | 6/2010 | Aggarwal et al. | |
| 8,391,164 B2 | 3/2013 | Cormode et al. | |
| 8,595,194 B2 * | 11/2013 | Cormode .......... | G06F 17/30551 707/689 |

(Continued)

OTHER PUBLICATIONS

Aggarwal, C., "A Framework for Projected Clustering of High Dimensional Data Streams", Proceedings of the 30th VLDB Conference, Toronto, Canada, www.vidb.org/conf/2004/RS21P7.PDF/, pp. 852-863, (2004).

*Primary Examiner* — Wilson Lee
(74) *Attorney, Agent, or Firm* — Finnegan, Henderson, Farabow, Garrett & Dunner LLP (57) ABSTRACT

The present disclosure provides systems and methods to estimate Importance Measure (IM) and temporal Importance Measure (IM) for any type of data in a distributed enterprise network by involving direct and indirect stakeholders of the data in the estimation process. Firstly data type of the received data is identified. Data type plugins including pre-defined classes, IM matrix and Temporal IM matrix are loaded for the identified data type. Extracted features from the data are appropriately mapped against pre-defined classes and then the IM is estimated. Temporal IM is estimated taking into account the current time and the rate of change.

19 Claims, 4 Drawing Sheets

(56) References Cited

U.S. PATENT DOCUMENTS

| | | | |
|---|---|---|---|
| 8,954,440 B1* | 2/2015 | Gattani | G06F 17/30011 |
| | | | 707/738 |
| 2006/0031216 A1* | 2/2006 | Semple | G06F 17/30858 |
| 2007/0073689 A1* | 3/2007 | Chandra | G06F 17/30115 |
| 2007/0143181 A1* | 6/2007 | Linkner | G06Q 30/02 |
| | | | 705/14.21 |
| 2008/0147578 A1* | 6/2008 | Leffingwell | G06F 17/30864 |
| | | | 706/20 |
| 2008/0147588 A1* | 6/2008 | Leffingwell | G06F 17/30864 |
| | | | 706/48 |
| 2008/0147641 A1* | 6/2008 | Leffingwell | G06F 17/30864 |
| 2010/0064111 A1* | 3/2010 | Kunimatsu | G06F 12/08 |
| | | | 711/161 |
| 2010/0122252 A1* | 5/2010 | Dasch | G06F 9/5083 |
| | | | 718/100 |
| 2011/0225594 A1* | 9/2011 | Iyengar | G06F 9/46 |
| | | | 718/105 |
| 2011/0283269 A1* | 11/2011 | Gass | G06F 8/65 |
| | | | 717/168 |
| 2011/0314029 A1 | 12/2011 | Fischer et al. | |
| 2012/0221411 A1* | 8/2012 | Graham, Jr. | G06Q 30/02 |
| | | | 705/14.52 |
| 2013/0067113 A1* | 3/2013 | Dugue | H04L 45/125 |
| | | | 709/241 |
| 2013/0070647 A1* | 3/2013 | Dugue | H04L 45/00 |
| | | | 370/255 |
| 2014/0196013 A1* | 7/2014 | Orr | G06F 11/3664 |
| | | | 717/125 |
| 2015/0170209 A1* | 6/2015 | Smith | G06Q 30/02 |
| | | | 705/14.64 |
| 2015/0206228 A1* | 7/2015 | Perez | G06Q 30/0645 |
| | | | 705/26.3 |
| 2017/0032694 A1* | 2/2017 | Brueckner | G09B 19/0053 |

* cited by examiner

SYSTEMS AND METHODS FOR ESTIMATING TEMPORAL IMPORTANCE OF DATA

PRIORITY CLAIM

This U.S. patent application claims priority under 35 U.S.C. § 119 to: India Application No. 3718/MUM/2015 filed on 30 Sep. 2015. The entire contents of the aforementioned application are incorporated herein by reference.

TECHNICAL FIELD

The embodiments herein generally relate to data management and more particularly to methods and systems for estimating temporal importance of data.

BACKGROUND

A distributed enterprise network is characterized by huge amount of data generated from various sources that is typically shared amongst users therein. Since huge amount of data is generated, it is difficult to process all data at one time. Therefore, it is recommended to prioritize data for processing to enable effective use of time and resources. Data can be associated with various aspects like features associated with different types of data, stakeholders and their take on the importance of data within each type of data, rate of change of importance of data over a period of time, and the like. It is a challenge to quantify the importance of data based on such associated factors, some of which may be dynamic in nature and hence associated weightage to such factors would vary over a period of time.

SUMMARY

Embodiments of the present disclosure present technological improvements as solutions to one or more of the above-mentioned technical problems recognized by the inventors in conventional systems.

In an aspect there is provided a computer implemented method for estimating temporal importance of data, the method comprising: receiving the data and identifying a data type based on at least one of associated metadata and header information; loading data type plugin for the identified data type; and estimating temporal Importance Measure of the received data based at least on the loaded data type plugin.

In an embodiment, the step of loading data type plugin comprises obtaining the data type plugin or updating the data type plugin from a server.

In an embodiment, the method described herein above further comprises the step of updating the estimated temporal Importance Measure of the received data at the server.

In an embodiment, the data type plugin comprises a set of pre-defined features, one or more methods to extract the features, one or more pre-defined classes mapped with pre-defined features, a list of stakeholders associated directly or indirectly with the received data, Importance Measure matrix and temporal Importance Measure Matrix corresponding to the identified data type.

In an embodiment, the step of estimating temporal Importance Measure of the received data is preceded by: extracting the set of pre-defined features from the received data using the loaded data type plugin; mapping the extracted features to the one or more pre-defined classes and generating a class vector based on the metadata and content of the received data, the class vector comprising elements indicative of presence or absence of the class for the received data; estimating Importance Measure of the received data; and updating the estimated Importance Measure of the received data at the server.

In an embodiment, the Importance Measure of the received data is based on the one or more pre-defined classes and Importance measure for the associated stakeholders for each of the one or more pre-defined classes within the identified data type.

In an embodiment, the Importance Measure is represented as an Importance Measure matrix M as $$M = \begin{array}{c} \\ \beta_1 \\ \beta_2 \\ \vdots \\ \beta_c \end{array} \begin{array}{c} \alpha_1 \quad \alpha_2 \quad \ldots \quad \alpha_s \\ \begin{pmatrix} m_{1,1} & m_{1,2} & \ldots & m_{1,s} \\ m_{2,1} & m_{2,2} & \ldots & m_{2,s} \\ \vdots & \vdots & \ddots & \vdots \\ m_{c,1} & m_{c,2} & \ldots & m_{c,s} \end{pmatrix} \end{array}, \text{ where } m_{i,j} \in \mathbb{R}$$

wherein $\beta_1, \beta_2, \ldots \beta_c$ represent the classes, s represents number of stakeholders $\alpha$, c represents the number of one or more pre-defined classes for the identified data type and m(i,j) represents ith class importance measure assigned by jth stakeholder, wherein the importance measure is a real number and is based on at least one determining factor.

In an embodiment, wherein the sum of importance measures for the one or more pre-defined classes within the identified data type is limited to a pre-defined budget allotted to each of the associated stakeholders.

In an embodiment, one of median, mean, mode, weighted mean and weighted median, of all the importance measures assigned to a class represents the importance measure for the associated stakeholders for the class in the one or more pre-defined classes.

In an embodiment, the step of estimating temporal Importance Measure is based on a rate constant assigned to the one or more pre-defined classes within the identified data type, the importance measure matrix, time factor associated with the received data and current time.

In an embodiment, at least some of the importance measures are assigned to the one or more pre-defined classes by the associated stakeholders.

In an embodiment, matrix completion techniques are utilized to generate importance measures when not assigned by the associated stakeholders.

In an embodiment, the temporal Importance Measure is represented by a temporal Importance Measure Matrix Mt as $$M_t(\tau) = \begin{pmatrix} m_{1,1} \cdot f(\lambda_{1,1}, t, \tau) & \ldots & m_{1,s} \cdot f(\lambda_{1,s}, t, \tau) \\ m_{2,1} \cdot f(\lambda_{2,1}, t, \tau) & \ldots & m_{2,s} \cdot f(\lambda_{2,s}, t, \tau) \\ \vdots & \ddots & \vdots \\ m_{c,1} \cdot f(\lambda_{c,1}, t, \tau) & \ldots & m_{c,s} \cdot f(\lambda_{c,s}, t, \tau) \end{pmatrix}$$

where, $f(\lambda_{i,j}, t, \tau) = \left(\frac{1}{2}\right)^{\frac{t-\tau}{\lambda_{i,j}}}$ wherein $\lambda$ represents the rate constant, $\tau$ represents the time factor associated with the received data and t represents the current time.

In an embodiment, the temporal importance measure of the received data is based on the class vector and the temporal Importance Measure Matrix Mt.

In an embodiment, the method described herein above further comprises comparing (i) the Importance Measure or the Temporal Importance Measure of the received data associated with a first identified data type with (ii) the Importance Measure or the Temporal Importance Measure of the received data associated with a second identified data type, wherein the step of comparing comprises: assigning a relative weight factor to the first identified data type and the second identified data type; and estimating normalized Importance Measure or normalized Temporal Importance Measure for the received data based on the assigned relative weight factor and the estimated Importance Measure or Temporal Importance Measure of the received data.

In an aspect, there is provided a system for estimating temporal importance of data, the system comprising: one or more processors; a communication interface device; one or more internal data storage devices operatively coupled to the one or more processors for storing: an Input module configured to receive and identify a data type based on at least one of associated metadata and header information; a data type plugin loader configured to facilitate loading of data type plugin for the identified data type; and a temporal Importance Measure estimator configured to estimate the temporal Importance Measure of the received data based at least on the loaded data type plugin.

In an embodiment, the system is at least one client system and the data type plugin or updates for the data type plugin for a data type is created on at least one server and shared with the at least one client system.

In an embodiment, the data type plugin comprises a set of pre-defined features, one or more methods to extract the features, one or more pre-defined classes mapped with pre-defined features, a list of stakeholders associated directly or indirectly with the received data, Importance Measure matrix and temporal Importance Measure Matrix corresponding to the identified data type.

In an embodiment, the system further comprises an availability checker configured to check whether the received data was pre-processed; a feature extractor configured to extract pre-defined features from the received data using the loaded data type plugin; a class marker configured to map the extracted features to at least one pre-defined class and generate a class vector for the received data, the class vector comprising elements indicative of presence or absence of the class for the received data and characterized by a size represented by number of one or more pre-defined classes defined for the identified data type; an Importance Measure estimator configured to estimate Importance Measure of the received data based on the one or more pre-defined classes and importance measure for associated stakeholders for each of the one or more pre-defined classes within the identified data type; an estimated Importance Measure manager-client configured to send and retrieve the estimated Importance Measure of the received data; a client database configured to store a unique identifier of the received data extracted by the feature extractor, the class vector of the received data, the estimated Importance Measure of the received data, the estimated temporal IM of the received data, time factor of the data and the time at which temporal Importance Measure of the received data is estimated.

In an embodiment, the at least one server comprises: data type plugins comprising comprises a set of pre-defined features, one or more methods to extract the features, one or more pre-defined classes mapped with pre-defined features, a list of stakeholders associated directly or indirectly with the received data, Importance Measure matrix and temporal Importance Measure Matrix corresponding to the identified data type; a server database configured to receive and store the unique identifier of the received data extracted by the feature extractor, the class vector of the received data, the estimated Importance Measure of the received data, the estimated temporal IM of the received data, time factor of the data and the time at which temporal Importance Measure of the received data is estimated from the client database; and an estimated Importance Measure manager-server configured to send stored estimated Importance Measure of the received data to the client database.

In an embodiment, the estimated Importance Measure manager-client is configured to have a two way communication of the estimated Importance Measure of the received data with the client database.

In an embodiment, the system further comprises a comparator constituting either the at least one client system or the at least one server, the comparator configured to compare (i) the Importance Measure or the Temporal Importance Measure of the received data associated with a first identified data type with (ii) the Importance Measure or the Temporal Importance Measure of the received data associated with a second identified data type, the comparator being further configured to: assign a relative weight factor to the first identified data type and the second identified data type; and estimate normalized Importance Measure or normalized Temporal Importance Measure for the received data based on the assigned relative weight factor and the estimated Importance Measure or Temporal Importance Measure of the received data.

In yet another aspect, there is provided a computer program product comprising a non-transitory computer readable medium having a computer readable program embodied therein, wherein the computer readable program, when executed on a computing device, causes the computing device to: receive the data and identify a data type based on at least one of associated metadata and header information; load data type plugin for the identified data type; and estimate temporal Importance Measure of the received data based at least on the loaded data type plugin.

It is to be understood that both the foregoing general description and the following detailed description are exemplary and explanatory only and are not restrictive of the invention, as claimed.

BRIEF DESCRIPTION OF THE DRAWINGS

The embodiments herein will be better understood from the following detailed description with reference to the drawings, in which.

It should be appreciated by those skilled in the art that any block diagram herein represent conceptual views of Illustrative systems embodying the principles of the present subject matter. Similarly, it will be appreciated that any flow charts, flow diagrams, state transition diagrams, pseudo code, and the like represent various processes which may be substantially represented in computer readable medium and so executed by a computing device or processor, whether or not such computing device or processor is explicitly shown.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
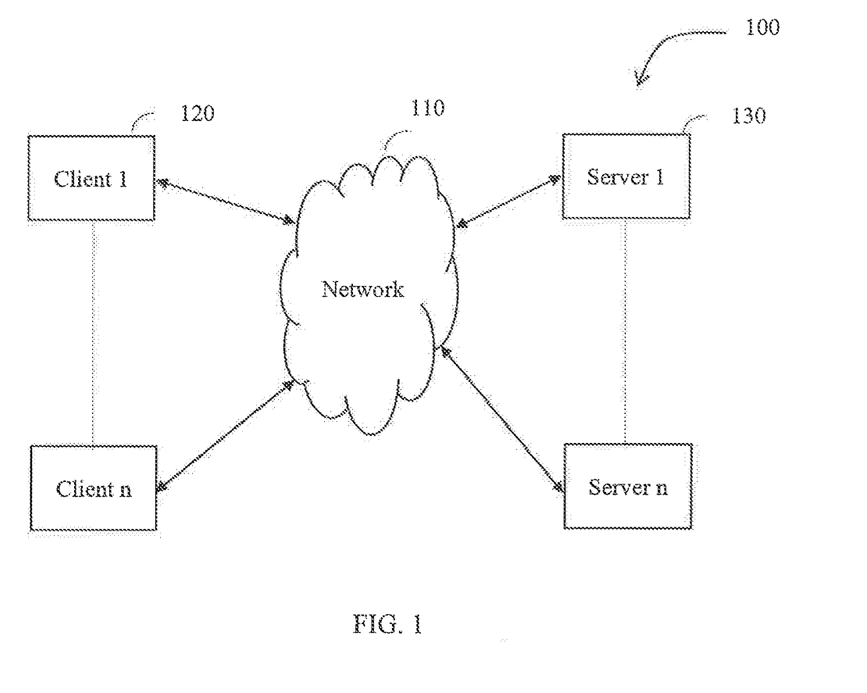
FIG. 1 illustrates an exemplary schematic diagram of a client-server network architecture in a distributed enterprise network, in accordance with one or more embodiments of the present disclosure.
Figure 2:
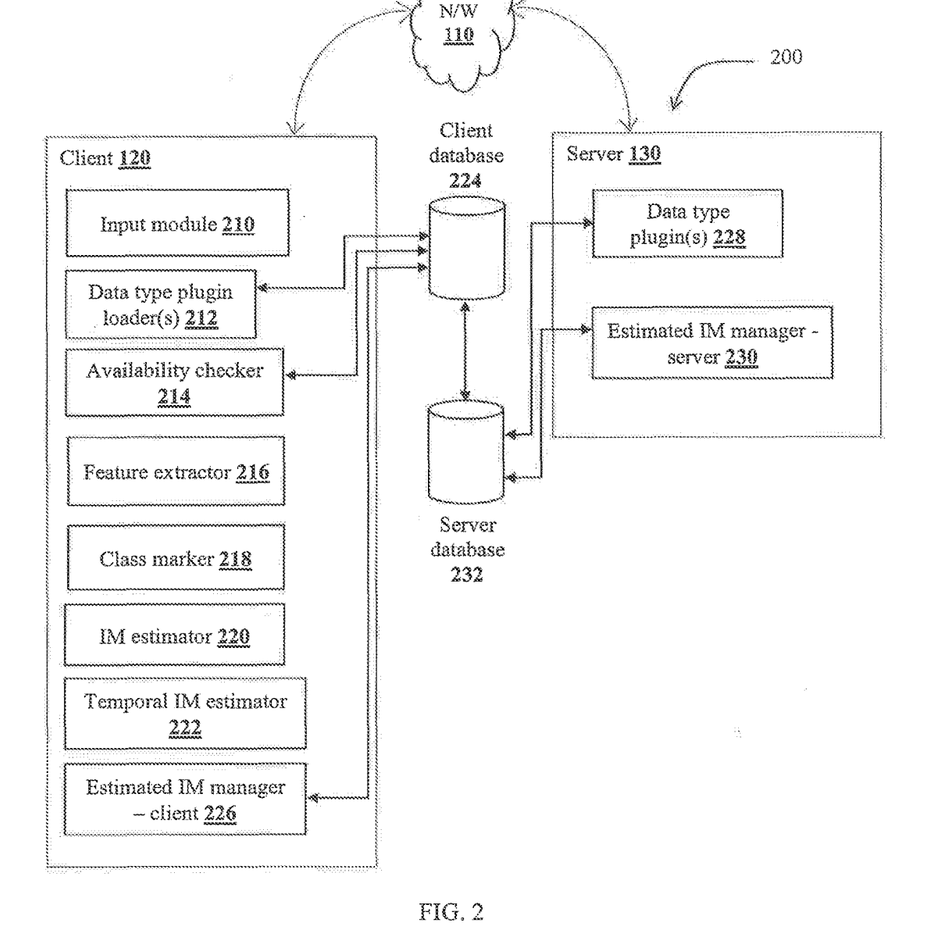
FIG. 2 illustrates an exemplary block diagram of a client-server system with functional modules in accordance with an embodiment of the present disclosure.
Figure 3:
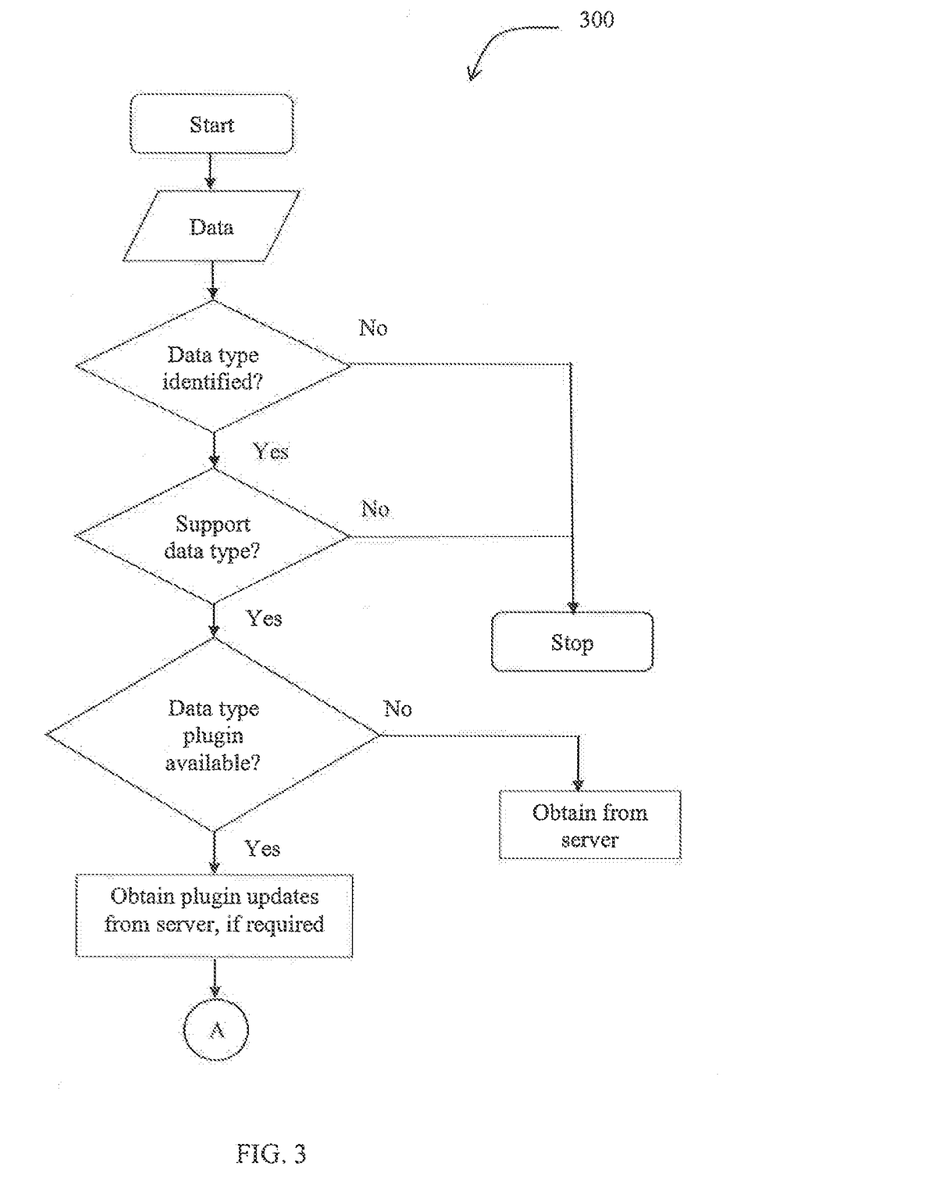
FIG. 3 is an exemplary flow diagram illustrating a computer implemented method for estimating Importance Measure of data using the system of FIG. 2 in accordance with an embodiment of the present disclosure.

Referring now to the drawings, and more particularly to FIGS. 1 through 3, where similar reference characters denote corresponding features consistently throughout the figures, there are shown preferred embodiments and these embodiments are described in the context of the following exemplary system and method.

Systems and methods for estimating temporal importance of data in a distributed enterprise network, in accordance with the present disclosure, ensure that data is prioritized not only on the basis of importance of data to the enterprise, but also takes into account stakeholders who may be directly or indirectly related to the data under consideration.

In the context of the present disclosure, the expression 'Importance Measure' or IM refers to a quantified value for the importance of a data, and not the value of the data itself. Every data generated will have an Importance Measure (IM) associated with it. It denotes the importance level of the data to both the enterprise as well as stakeholders of the data. Once the IM is estimated for a given data, it increases, reduces or remains constant with respect to time. Thus, the IM may change with time. Systems and methods of the present disclosure provide a generic methodology to estimate temporal IM for any type of data. Furthermore, systems and methods of the present disclosure involve direct and indirect stakeholders of the data in the estimation process. Stakeholders are important because they are responsible for the data, hence their view on importance of the data must also be included for the estimation.

FIG. 1 illustrates an exemplary schematic diagram of client-server network architecture 100 in a distributed enterprise network, in accordance with an embodiment of the present disclosure and FIG. 2 illustrates an exemplary block diagram of a client-server system 200 with functional modules in accordance with an embodiment of the present disclosure. In an embodiment, system 200 can reside on one or more computers and include one or more processors (not shown), communication interface or input/output (I/O) interface (not shown), and memory or one or more internal data storage devices (not shown) operatively coupled to the one or more processors. The one or more internal data storage devices may be interchangeably referred to as memory or database (client database/server database) in the context of the present disclosure. The one or more processors can be implemented as one or more microprocessors, microcomputers, microcontrollers, digital signal processors, central processing units, state machines, logic circuitries, and/or any devices that manipulate signals based on operational instructions. Among other capabilities, the processor(s) is configured to fetch and execute computer-readable instructions stored in the memory.

In an embodiment, system 200 can be implemented involving a variety of computing systems, such as a laptop computer, a desktop computer, a notebook, a workstation, a mainframe computer, a server, a network server, cloud, hand-held device and the like. Computing systems constituting client 120 are in communication with computing systems constituting server 130 via any type of network 110. The I/O interface can include a variety of software and hardware interfaces, for example, a web interface, a graphical user interface, and the like and can facilitate multiple communications within a wide variety of networks 110 and protocol types, including wired networks, for example, LAN, cable, etc., and wireless networks, such as WLAN, cellular, or satellite. In an embodiment, the I/O interface can include one or more ports for connecting a number of devices to one another or to another server. The memory may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, the memory can include local memory employed during actual execution of program code, bulk storage, and cache memories which provide temporary storage of at least some program code in order to reduce the number of times code must be retrieved from bulk storage during execution. In an embodiment, the various modules of system 200 can be stored in the memory.

In accordance with an embodiment, client 120 estimates the IM of data available or generated in a distributed enterprise system and sends the estimated IM to server 130. Server 130 stores estimated IM of data estimated in each client 120 in the enterprise system. Client 120 can ping the server to get information of already estimated IM of data. Client 120 also stores locally estimated IM of data, so that it can work independently also, if server 130 is down or client 120 is offline or not connected to network 110. Although system 200 of FIG. 2 represents a single client 120 and a single server 130, it may be understood by a person skilled in the art, as illustrated in FIG. 1, that there may be one or more clients 120 and servers 130 in a distributed enterprise network under consideration in the present disclosure.

In accordance with an embodiment, for estimating the IM of data, client 120 first identifies the data type. The data type is identified by using metadata and/or header information of the data. In the context of the present disclosure, the expression "data type" refers to characterization of data into a feature set having identical features, for example email can be a data type and every email received can be a data. Thus, data from Outlook, Lotus Notes® or any E-mail client can be categorized into email data type. Similarly, data generated to identify the skill set of a user can be categorized as skill set data type. Thus, every data received can be categorized into a particular data type. For any given data type, it has certain features associated with it. Based on different values of the feature set comprising features associated therein, there are different classes within a data type. Similarly, for a given data type, there are certain stakeholders associated with it. Therefore, once a data type is identified, its corresponding features are extracted from the given data. Using the extracted features, a class vector C is identified, the class vector comprising elements indicative of presence or absence of the class for the received data. In accordance with the present disclosure, the class vector C represents internal categorization of data based on the presence or absence of associated features. A given data has an IM associated with it. In accordance with the present disclosure, IM is estimated both from the enterprise as well as stakeholder's point of view. The estimated IM of data is created or made available to the enterprise at a given point in time. IM of data can change with time. In accordance with the present disclosure, rate of change of IM of data is defined by the stakeholders for a data type, as they have better expertise and knowledge about the data type. Systems and methods of the present disclosure thus enable computing of IM Matrix M and temporal IM matrix Mt. Class vector C along with the IM Matrix M and Temporal IM Matrix Mt are therefore used to estimate the IM as well as temporal IM of the given data.

Systems and methods of the present disclosure will now be explained with reference to FIG. 2 and FIG. 3 wherein FIG. 3 is a flow chart illustrating process flow involved in accordance with the method of the present disclosure. In an embodiment; the client-server system 200 includes client 120 in communication with server 130 via network 110. In an embodiment, client 120 can work independently with limited capabilities without taking advantage of the distributed nature of data in an enterprise. When client 120 is connected to server 130, the state of client 120 is referred to as online; alternatively it is referred to as offline. Exemplary functional modules of client 120 can include data type plugin loader 212 configured to load data type plugins 228 from server 130. Data type plugins 228 support IM estimations for different data types. Every data type requires data type plugin 228 which can include a feature set corresponding to the data type and methods to extract the feature sets. Data type plugins 228 also include list of classes and the mapping of features to each class. Further, data type plugins 228 also include a list of corresponding stakeholders, IM Matrix M, and temporal IM Matrix Mt, for that data type. Therefore, in accordance with an embodiment, each data type plugin 228 includes set of pre-defined feature, classes, stakeholders, IM Matrix M and temporal IM Matrix Mt corresponding to each data type. Data type plugin loaders 212 on client 120 loads the required data type plugin 228 as and when it is required. When a new data type support needs to be added to client 120, a new data type plugin 228 has to be created on server 130 that can be shared across various clients 120 in the distributed enterprise network. Similarly, update or removal of data type plugin 228 can be done from server 130 in the distributed enterprise network. Thus, in accordance with an embodiment, when client 120 connects with server 130, a client request for any new or updated data type plugin 228 can be serviced by server 130.

In an embodiment client 120 includes input module 210 configured to firstly receive data and identify the data type based on its metadata and/or header information. Secondly, once the data type is identified, input module 210 checks whether data type plugin 228 is available at client 120 for the identified data type. Data type plugin loader 212 loads corresponding data type plugin 220 if available at client 120 or obtains it from server 130. In an embodiment, data type plugin loader 212 can obtain updated data type plugin 220 from server, if there is an updated version on server 130. Alternatively, if there is no support for the identified data type, further processing of the received data to estimate IM is aborted. In an embodiment, availability checker 214 connects with client database 224 to check whether the received data has been processed earlier by system 200. In the event that the received data has already been processed earlier, step of estimating temporal IM of the received data is executed by Temporal IM estimator 222. Alternatively, if the received data is not processed earlier, Feature Extractor 216 extracts pre-defined features from the received data using the method defined in the loaded data type plugin 228 and Class Marker 218 maps the extracted features with pre-defined classes for the identified data type to generate class vector C. IM estimator 220 then proceeds to estimate the IM of the data. Temporal IM estimator 222 estimates the temporal importance measure of the data using the class vector C, time factor associated with the data and Temporal IM Matrix, Mt from data type plugin 228. Once the IM estimation process is done, unique identifier such as hash of the data, metadata, and the like extracted by Feature Extractor 216, class vector C, IM of the data, temporal IM of the data, time factor of the data and the time at which temporal IM of the data is estimated are stored in client database 224 and at server database 232 periodically or when client 120 is online.

In an embodiment, temporal IM estimator 222 of client 120 is configured to estimate current temporal IM of the data based on the identified data type of the received data. Every data has a time factor associated with it. This denotes the time at which the data is made available or the time at which the data is created in system 200. In the event that the received data is modified, the IM estimated for the data is replaced by a new IM and the time factor associated with the data is also updated accordingly. Such updated information including the latest IM in the form of estimated IM is updated both in client database 224 and also on server database 232, unless client 120 is offline or not connected to network 110. When a new client 120 is connected to server 130 or client 120 changes its state from offline to online, then the first step is to synchronize data type plugins. Once data type plugins are updated, the estimated IM of data are updated to server 130.

In an embodiment, estimated IM manager-client 226 of client 120 is configured to send and retrieve the estimated IM for every data received by the client to and from client database 224. The estimated IM for every data is stored in client database 224 for retrieval as when it is required. Estimated IM manager-client 226 is also configured to send estimated IM for every data from client database 224 to server database 232 when client 120 is online or connected to network 110.

In an embodiment, estimated IM manager-server 230 of server 130 is configured to send stored estimated IM from server database 232 to client database 224 when a client request is received pertaining to information already available in the event that the received data was earlier processed by system 200 through say another client 120 in system 200. Estimated IM manager-server 230 is also configured to retrieve and update estimated IM for every data from client database 224, when client 120 is online.

In an embodiment, mapping of extracted features of the received data by feature extractor 216 can be mutually exclusive. Alternatively, in another embodiment, more than one class can be mapped to extracted features of the received data. Accordingly, the output of class marker 218 is a class vector C having a size that represents number of classes pre-defined for each data type. The value of each element in the class vector is 1 or 0 based on the presence of that class in the set of mapped classes. Let, the set of classes be $\{\beta_1, \beta_2 \ldots \beta_c\}$, where there are c classes in a data type. The class vector is denoted as $C=\{b_1, b_2, \ldots b_c\}$, where bi are 1 or 0 for each class (depending on the presence or absence of the class) in the data type and n is the size of the class vector C.

In an embodiment, the IM of data depends on its content, metadata as well as the stakeholders who are directly or indirectly associated with the data. The class vector C, is formed based on the metadata and the content of the received data. The stakeholder's importance are captured in IM Matrix, M. For a given data type there are a set of stakeholders {α1, α2, . . . , αs} associated with it. Each stakeholder has different importance for each class within the data type. Therefore, it is critical to capture the importance measure for all classes for each stakeholder. This is represented as Matrix M as shown herein below.

$$M = \begin{pmatrix} & \alpha_1 & \alpha_2 & \ldots & \alpha_s \\ \beta_1 & m_{1,1} & m_{1,2} & \ldots & m_{1,s} \\ \beta_2 & m_{2,1} & m_{2,2} & \ldots & m_{2,s} \\ \vdots & \vdots & \vdots & \ddots & \vdots \\ \beta_c & m_{c,1} & m_{c,2} & \ldots & m_{c,s} \end{pmatrix}, \text{ where } m_{i,j} \in \mathbb{R},$$

wherein s is the number of stakeholders, n is the number of pre-defined classes for a given data type. The importance measure $m_{i,j}$ being a real number (R) denotes the $i^{th}$ class importance measure for $j^{th}$ stakeholder wherein the importance measure is a real number. Thus, M represents the importance measure matrix of classes for each stakeholder and using the class vector C, the enterprise importance measure of the given data is calculated as indicated herein above. The importance measure of the given data for a particular stakeholder is calculated by taking only that particular column, corresponding to that stakeholder from matrix M and it is multiplied with the class vector C. Thus, the Importance measure of data for an enterprise as well as for each stakeholders can be calculated using the matrix M and class vector C.

The matrix M represents the importance measure of each class for all the stakeholders in a data type. Hence, the stakeholders assign the IM of the data. The stakeholders assign IM based on certain determining factors. These determining factors are common to a particular data type and may be different for different data types. These factors help the stakeholders to assign the IM for a class in a data type. For example, for a document data type, some factors that may be considered by stakeholders for assigning the IM of the data include 1) owner of the data 2) use of the data to the stakeholder 3) data recovery time if the data is destroyed 4) impact factor when the data is lost outside enterprise as well outside a group within enterprise. For a given data type, summation of importance measure assigned by all the stakeholders gives the Importance measure for the enterprise. Each data type is associated with an IM matrix and a temporal IM matrix. There can be scenarios where a stakeholder of the data type might be familiar with only few classes in that data type. Hence, the stakeholder might miss assigning IM for such classes. Thus, when forming the matrix, some entries may be missing. Since, the assignment of IM for classes is an independent and random event, matrix completion techniques can be applied to fix the missing entries. For example, in an embodiment, Singular Value Thresholding techniques can be used for estimating the missing entries in a low rank matrix.

In an enterprise, each individual or group of individuals identified by the enterprise is denoted as user set. Each individual from the user set can play different stakeholder roles. In the instant disclosure, for a given stakeholder there can be more than one individuals from the user set to form a stakeholder set. These sets can be same for all the data types or can vary for different data type.

In an embodiment, for a data type, each individual from the stakeholder set is allotted budget B, for example 100 and IM for classes in that data type are to be assigned values within the allotted budget. In the absence of budget B, in an exemplary situation, one individual can assign a value in the range of 0 to 10, another individual can assign a value in the range of 1 to 100, or altogether an arbitrary number thereby losing out on consistency of assigned values due to assigning of random IM. The present method therefore enables allotting budget B and the sum of assigned IM for classes must not exceed the budget, but can be less than the budget. The entire allotted budget B may not be utilized but values more than the allotted budget cannot be assigned. The IM of a class by a stakeholder can be computed as one of median, mean, mode, weighted mean, weighted median and the like of all the IM assigned by each individual from the stakeholder set for the class. In an embodiment, the median of all the IM assigned by each individual from the stakeholder set for a class becomes the IM of that stakeholder for that class.

In an embodiment, temporal IM estimator 222 estimates the temporal IM of the data. The IM of data is not static. The IM of data changes with the time. IM of some data changes faster than others and for some data importance measure doesn't change at all. This is captured using rate constant (λ). A positive rate constant decreases the IM while a negative rate constant increases the IM of data. For a data type, each stakeholder in that data type can assign different rate constants to all classes in that data type. The matrix M, rate constant λ, time factor τ associated with the data and the current time t is used in the formation of the matrix, Mt which can be represented as shown herein below.

$$M_t(\tau) = \begin{pmatrix} m_{1,1} \cdot f(\lambda_{1,1}, t, \tau) & \ldots & m_{1,s} \cdot f(\lambda_{1,s}, t, \tau) \\ m_{2,1} \cdot f(\lambda_{2,1}, t, \tau) & \ldots & m_{2,s} \cdot f(\lambda_{2,s}, t, \tau) \\ \vdots & \ddots & \vdots \\ m_{c,1} \cdot f(\lambda_{c,1}, t, \tau) & \ldots & m_{c,s} \cdot f(\lambda_{c,s}, t, \tau) \end{pmatrix}$$

where, $f(\lambda_{i,j}, t, \tau) = \left(\frac{1}{2}\right)^{\frac{t-\tau}{\lambda_{i,j}}}$ Once the Mt matrix is formed, then the current temporal IM of the data is calculated as shown herein below.

$$IM_{data}(t) = (C \cdot M_t) \cdot \vec{1}^T$$

The IM of a data is estimated based on a particular data type. In accordance with the present disclosure, IM of data associated with a particular data type can be compared with IM of data associated with another data type. The estimated IM of the data is normalized for the comparison. In an embodiment, the system 200 further comprises a comparator (not shown) constituting either the client 120 or the server 130, the comparator configured to compare (i) the Importance Measure or the Temporal Importance Measure of the received data associated with a first identified data type with (ii) the Importance Measure or the Temporal Importance Measure of the received data associated with a second identified data type, the comparator being further configured to: assign a relative weight factor to the first identified data type and the second identified data type; and estimate normalized Importance Measure or normalized Temporal Importance Measure for the received data based on the assigned relative weight factor and the estimated Importance Measure or Temporal Importance Measure of the received data. As will be understood by a person skilled in the art, the expressions first and second identified data type is merely exemplary and not meant to be indicative of two data types only. For example, assume there are 2 data types DT1 having a weight factor 2 and DT2 having weight factor 1 represented as DT1[2] and DT2[1] respectively. Assuming, there are 3 data received—D1 of data type DT1 having IM 43, D2 of data type DT1 having IM 32 and D3 of data type DT2 having IM 80 represented as D1{43}-DT1, D2{32}-DT1, D3{80}-DT2 respectively. To compare the IM of data across data types, the weight factor of the data type is multiplied with the IM of the data to obtain normalized IM as D1{86}, D2{64} and D3{80}. Therefore, although the IM of D1>D2 and D3>D2, normalized IM indicates that D1>D3>D2.

For ease of explanation, the description of systems and methods of the present disclosure is provided with reference to a non-limiting example of an enterprise having an email server and client. Most enterprises use email applications such as Outlook, Lotus Notes®, Thunderbird, Zimbra and the like. Systems and methods of the present disclosure provide generic features that may be employed irrespective of the type of email application. In an embodiment, systems and methods of the present disclosure can provide email application specific features. For different type of email servers, API to access the email and extract the required features are provided. The methods are pre-defined in the data type plugins for the identified email type of data. Emails in an enterprise are first categorized as belonging to email data type and features extracted can, in an embodiment, include sender information (from), receiver information (sent to), CC and BCC user(s) information, time at which the email is sent or received from the sender/receiver's perspective, email is encrypted, email is signed, size of the email and attachment count.

In the example, the IM of email data is estimated in an enterprise. It is assumed that users or stakeholders involved in the email communication have certain designations. In the context of the instant disclosure, the expression "designation" may be associated with a static or dynamic position in the enterprise. These designations are ordered, that is one designation is higher compared to other designation as well there can be more than one designations with same ordering. Therefore, let there be a tree data structure with highest designation in the root and the lowest designations in the leaves. For a given designation $D_i$, designations having depth (number of edges in the path from the root to that node in the tree) more than the depth of $D_i$ are referred as Junior roles, designations having same depth as depth of $D_i$ are referred as Peer roles and finally designations having depth lesser than the depth of $D_i$ are referred as Senior roles. Stakeholders in the email communication can include sender(s), receiver(s), CC (Carbon Copy) and BCC (Blind Carbon Copy). The designation of the stakeholders (except sender) in the email is defined from the sender's designation. The mapping of features to the classes (referred to as Importance Level IL class) is given herein below.

| Class | | Feature Mapping | | |
|---|---|---|---|---|
| IL 1 | Senior Role | Email is encrypted and signed | | |
| IL 2 | Senior Role | Only encrypted | # attachment > 5 | Size of email > 50% |
| IL 3 | Senior Role | Only signed | 3 < # attachment ≤ 5 | 25% ≤ Size of email ≤ 50% |
| IL 4 | Senior Role | | # attachment ≤ 3 | Size of email < 25% |
| IL 5 | Peer Role | Email is encrypted and signed | | |
| IL 6 | Peer Role | Only encrypted | # attachment > 5 | Size of email > 50% |
| IL 7 | Peer Role | Only signed | 3 < # attachment ≤ 5 | 25% ≤ Size of email ≤ 50% |
| IL 8 | Peer Role | | # attachment ≤ 3 | Size of email < 25% |
| IL 9 | Junior Role | Email is encrypted and signed | | |
| IL 10 | Junior Role | Only encrypted | # attachment > 5 | Size of email > 50% |
| IL 11 | Junior Role | Only signed | 3 < # attachment ≤ 5 | 25% ≤ Size of email ≤ 50% |
| IL 12 | Junior Role | | # attachment ≤ 3 | Size of email < 25% |

Here the class IL 1 to IL 12 are ordered with respect to ranking such that IL 1 is highest and IL 12 is lowest. Classes can be grouped according to the roles, such as IL 1 to IL 4 forms a group and IL 5 to IL 8 forms another group, finally IL 9 to IL 12 forms yet another group. For a given mail, there can be cases where more than one class can be mapped within a group. In such cases, the higher rank class in that group is considered. Whereas if more than one class is mapped across different groups, then all must be considered. Here the feature mapping uses OR operator except for the role. For instance, it may be noted that for class IL 2, the email must have a senior role and either it must be encrypted only or number of attachment must be greater than 5 or size of the mail must be greater than 50% of the mail size limit set in an enterprise.

The stakeholders for email data type, in this example, are described from the current user's point of view. Hence, the current user for whom the IM of email is estimated can be Sender, Receiver, CC and BCC in the mail. Therefore, these are the stakeholders for the email data type. An exemplary IM Matrix M can be as given below.

$$M = \begin{matrix} & \text{Sender} & \text{Receiver} & CC & BCC \\ IL1 & 10 & 10 & 10 & 10 \\ IL2 & 9 & 9.5 & 8 & 9 \\ IL3 & 8 & 9.5 & 7.5 & 8 \\ IL4 & 8 & 8 & 7 & 8 \\ IL5 & 10 & 10 & 9 & 6.5 \\ IL6 & 8.35 & 8 & 7.35 & 5.5 \\ IL7 & 7.35 & 7 & 7.15 & 5 \\ IL8 & 7 & 7 & 7 & 5 \\ IL9 & 10 & 10 & 8 & 10 \\ IL10 & 8.30 & 8 & 6 & 4.5 \\ IL11 & 7 & 6.5 & 5 & 3.5 \\ IL12 & 7 & 6.5 & 4 & 2 \end{matrix}$$

The budget for email data type is 100. Therefore, the sum of IM assigned by each stakeholders must not exceed 100 but can go below 100. Similarly, based on the rate constant $\lambda$, time factor $\tau$ associated with the data and the current time t, Temporal IM Matrix Mt can be formed. Using the pre-defined classes, IM Matrix M and Temporal IM Matrix Mt from the data type plugins, for a given email, and the method defined in the data type plugin, features of the data are extracted. After the features are extracted, they are mapped to the pre-defined classes. Here for an email there can be more than one class, for example if there is a email with 1 attachment of 10 KB mail size sent to a senior role person, keeping junior role person in CC, then this mail is mapped to IL 4 and IL 12 class. It forms a class vector C=[0,0,0,1, 0,0,0,0,0,0,0,1]. This class vector multiplied with IM Matrix M would give an output [15,14.5,11,10]. This is again multiplied by $1^T$. The final IM of that email is 50.5. Theoretically, the class vector C can be [1, 1, 1, 1, 1, 1, 1, 1, 1, 1, 1]. In such a theoretical case, the maximum IM will be 363. Practically as per the defined mapping of feature to class for email data type, class vector C can take [1, 1, 0, 0, 1, 1, 0, 0, 1, 1, 0, 0] and the max IM will be 204. Therefore IM of 50.5 is 24.75% of the maximum IM possible.

In accordance with the present disclosure, the estimated IM of data can be used to prioritize the data in different applications. One of the utility of IM of data is backup planning. The estimated IM gives an indication as to which data is more important and based on that the backup can be scheduled for more important data first and then other data. In an exemplary embodiment, consider data from a laptop as well as a desktop has to be backed up. Since laptop will not be connected to an enterprise network after office hours, backup planning can assign a higher weightage to data in laptop with respect to the data residing in desktop as it will be connected to enterprise even after office hours. In accordance with the present disclosure, the estimated IM of data can also be used for valuation of the data. Here valuation can be economic value of the data. Again, enterprise policies or pre-defined external factors at various levels can be considered for estimating IM of data. For instance, in valuation of data, consider a scenario wherein data residing in an associate's system as well as data in a manager's system has same IM while data can be completely different. This is possible because, IM is a scalar value. In such scenarios, based on certain analytics as well as enterprise policies, the valuation of data can be different. Estimation of IM of data can thus be used for various applications to ensure effective utilization or processing of available data from large chunks of data typically available or generated in a distributed enterprise network. In accordance with the present disclosure, in an embodiment, the server can be configured to perform analytics required for some of the above mentioned applications.

The written description describes the subject matter herein to enable any person skilled in the art to make and use the embodiments of the instant disclosure. The scope of the subject matter embodiments defined here may include other modifications that occur to those skilled in the art. Such other modifications are intended to be within the scope if they have similar elements that do not differ from the literal language of the claims or if they include equivalent elements with insubstantial differences from the literal language.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, systems and methods of the present disclosure may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules comprising the system of the present disclosure and described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device. The various modules described herein may be implemented as either software and/or hardware modules and may be stored in any type of non-transitory computer readable medium or other storage device. Some non-limiting examples of non-transitory computer-readable media include CDs, DVDs, BLU-RAY, flash memory, and hard disk drives.

Further, although process steps, method steps, techniques or the like may be described in a sequential order, such processes, methods and techniques may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

It is intended that the disclosure and examples be considered as exemplary only, with a true scope and spirit of disclosed embodiments being indicated by the following claims.

What is claimed is:

1. A computer implemented method for estimating temporal importance of data to prioritize the data for processing in a distributed enterprise network, the method comprising:

receiving the data and identifying a data type based on at least one of associated metadata and header information;

loading data type plugin for the identified data type, wherein the loading comprises obtaining the data type plugin or updating the data type plugin from a server, wherein the data type plugin comprises a set of pre-defined features, one or more methods to extract features, one or more pre-defined classes mapped with the pre-defined features, a list of stakeholders associated directly or indirectly with the received data, Importance Measure matrix and temporal Importance Measure Matrix corresponding to the identified data type; and estimating temporal Importance Measure of the received data based at least on the loaded data type plugin, and wherein estimating the temporal Importance Measure includes current time and rate of change of importance of the received data over a period of time.

2. The computer implemented method of claim 1, further comprising the step of updating the estimated temporal Importance Measure of the received data at the server.

3. The computer implemented method of claim 2, wherein the step of estimating the temporal Importance Measure of the received data is preceded by:

extracting the set of pre-defined features from the received data using the loaded data type plugin;

mapping the extracted features to the one or more pre-defined classes and generating a class vector based on the metadata and content of the received data, the class vector comprising elements indicative of presence or absence of the class for the received data;

estimating Importance Measure of the received data; and updating the estimated Importance Measure of the received data at the server.

4. The computer implemented method of claim 3, wherein the Importance Measure of the received data is based on the one or more pre-defined classes and importance measure for the associated stakeholders for each of the one or more pre-defined classes within the identified data type.

5. The computer implemented method of claim 4, wherein the Importance Measure is represented as an Importance Measure matrix M as $$M = \begin{pmatrix} & \alpha_1 & \alpha_2 & \cdots & \alpha_s \\ \beta_1 & m_{1,1} & m_{1,2} & \cdots & m_{1,s} \\ \beta_2 & m_{2,1} & m_{2,2} & \cdots & m_{2,s} \\ \vdots & \vdots & \vdots & \ddots & \vdots \\ \beta_c & m_{c,1} & m_{c,2} & \cdots & m_{c,s} \end{pmatrix}, \text{ where } m_{i,j} \in \mathbb{R},$$

wherein $\beta_1, \beta_2, \ldots \beta_c$ represent the classes, s represents number of stakeholders $\alpha$, c represents the number of one or more pre-defined classes for the identified data type and m(i,j) represents $i^{th}$ class importance measure assigned by $j^{th}$ stakeholder, wherein the importance measure is a real number and is based on at least one determining factor.

6. The computer implemented method of claim 5, wherein sum of importance measures for the one or more pre-defined classes within the identified data type is limited to a pre-defined budget allotted to each of the associated stakeholders.

7. The computer implemented method of claim 5, wherein one of median, mean, mode, weighted mean and weighted median, of all the importance measures assigned to a class represents the importance measure for the associated stakeholders for the class in the one or more pre-defined classes.

8. The computer implemented method of claim 5, wherein the step of estimating the temporal Importance Measure is based on a rate constant assigned to the one or more pre-defined classes within the identified data type, the Importance Measure matrix, time factor associated with the received data and current time.

9. The computer implemented method of claim 5, wherein at least some of the importance measures are assigned to the one or more pre-defined classes by the associated stakeholders.

10. The computer implemented method of claim 9, wherein matrix completion techniques are utilized to generate the importance measures when not assigned by the associated stakeholders.

11. The computer implemented method of claim 5, wherein the temporal Importance Measure is represented by a temporal Importance Measure Matrix $M_t$ as $$M_t(\tau) = \begin{pmatrix} m_{1,1} \cdot f(\lambda_{1,1}, t, \tau) & \cdots & m_{1,s} \cdot f(\lambda_{1,s}, t, \tau) \\ m_{2,1} \cdot f(\lambda_{2,1}, t, \tau) & \cdots & m_{2,s} \cdot f(\lambda_{2,s}, t, \tau) \\ \vdots & \ddots & \vdots \\ m_{c,1} \cdot f(\lambda_{c,1}, t, \tau) & \cdots & m_{c,s} \cdot f(\lambda_{c,s}, t, \tau) \end{pmatrix}$$

where, $f(\lambda_{i,j}, t, \tau) = \left(\frac{1}{2}\right)^{\frac{t-\tau}{\lambda_{i,j}}}$, wherein $\lambda$ represents the rate constant, $\tau$ represents the time factor associated with the received data and t represents the current time.

12. The computer implemented method of claim 11, wherein the temporal Importance Measure of the received data is based on the class vector and the temporal Importance Measure Matrix $M_t$.

13. The computer implemented method of claim 12, further comprising: comparing (i) the Importance Measure or the temporal Importance Measure of the received data associated with a first identified data type with (ii) the Importance Measure or the temporal Importance Measure of the received data associated with a second identified data type, wherein the step of comparing comprises: assigning a relative weight factor to the first identified data type and the second identified data type; and estimating normalized Importance Measure or normalized temporal Importance Measure for the received data based on the assigned relative weight factor and the estimated Importance Measure or temporal Importance Measure of the received data.

14. A system for estimating temporal importance of data to prioritize the data for processing in a distributed enterprise network, the system comprising:

one or more processors;

a communication interface device;

one or more internal data storage devices operatively coupled to the one or more processors for storing:

an input module configured to receive and identify a data type based on at least one of associated metadata and header information;

a data type plugin loader configured to facilitate loading of data type plugin for the identified data type, wherein the loading comprises obtaining the data type plugin or updating the data type plugin from at least one server, wherein the data type plugin comprises a set of pre-defined features, one or more methods to extract features, one or more pre-defined classes mapped with the pre-defined features, a list of stakeholders associated directly or indirectly with the received data, Importance Measure matrix and temporal Importance Measure Matrix corresponding to the identified data type; and a temporal Importance Measure estimator configured to estimate the temporal Importance Measure of the received data based at least on the loaded data type plugin, and wherein estimating the temporal Importance Measure includes current time and rate of change of importance of the received data over a period of time.

15. The system of claim 14, wherein the system is at least one client system and the data type plugin or updates for the data type plugin for a data type is created on the at least one server and shared with the at least one client system.

16. The system of claim 15, further comprising:

an availability checker configured to check whether the received data was pre-processed;

a feature extractor configured to extract the pre-defined features from the received data using the loaded data type plugin;

a class marker configured to map the extracted features to at least one pre-defined class and generate a class vector for the received data, the class vector comprising elements indicative of presence or absence of the class for the received data and characterized by a size represented by number of the one or more pre-defined classes defined for the identified data type;

an Importance Measure estimator configured to estimate Importance Measure of the received data based on the one or more pre-defined classes and importance measure for associated stakeholders for each of the one or more pre-defined classes within the identified data type;

an estimated Importance Measure manager-client configured to send and retrieve the estimated Importance Measure of the received data;

a client database configured to store a unique identifier of the received data extracted by the feature extractor, the class vector of the received data, the estimated Importance Measure of the received data, the estimated temporal Importance Measure of the received data, time factor of the data and the time at which temporal Importance Measure of the received data is estimated.

17. The system of claim 16, wherein the at least one server comprises:

data type plugins comprising a set of pre-defined features, one or more methods to extract features, one or more pre-defined classes mapped with pre-defined features, a list of stakeholders associated directly or indirectly with the received data, Importance Measure matrix and temporal Importance Measure Matrix corresponding to the identified data type;

a server database configured to receive and store the unique identifier of the received data extracted by the feature extractor, the class vector of the received data, the estimated Importance Measure of the received data, the estimated temporal Importance Measure of the received data, the time factor of the data and the time at which temporal Importance Measure of the received data is estimated from the client database; and an estimated Importance Measure manager-server configured to send stored estimated Importance Measure of the received data to the client database.

18. The system of claim 17, further comprising a comparator constituting either the at least one client system or the at least one server, the comparator configured to compare (i) the Importance Measure or the temporal Importance Measure of the received data associated with a first identified data type with (ii) the Importance Measure or the temporal Importance Measure of the received data associated with a second identified data type, the comparator being further configured to: assign a relative weight factor to the first identified data type and the second identified data type; and estimate normalized Importance Measure or normalized temporal Importance Measure for the received data based on the assigned relative weight factor and the estimated Importance Measure or temporal Importance Measure of the received data.

19. A computer program product comprising a non-transitory computer readable medium having a computer readable program embodied therein, wherein the computer readable program, when executed on a computing device, causes the computing device to:

receive the data and identify a data type based on at least one of associated metadata and header information;

load data type plugin for the identified data type, wherein the loading comprises obtaining the data type plugin or updating the data type plugin from a server, wherein the data type plugin comprises a set of pre-defined features, one or more methods to extract features, one or more pre-defined classes mapped with the pre-defined features, a list of stakeholders associated directly or indirectly with the received data, Importance Measure matrix and temporal Importance Measure Matrix corresponding to the identified data type; and estimate temporal Importance Measure of the received data based at least on the loaded data type plugin, and wherein estimating the temporal Importance Measure includes current time and rate of change of importance of the received data over a period of time.

* * * * *